July 5, 1960
B. F. BJORNSON
2,943,745
THERMOMETER HOLDER
Filed Jan. 20, 1959
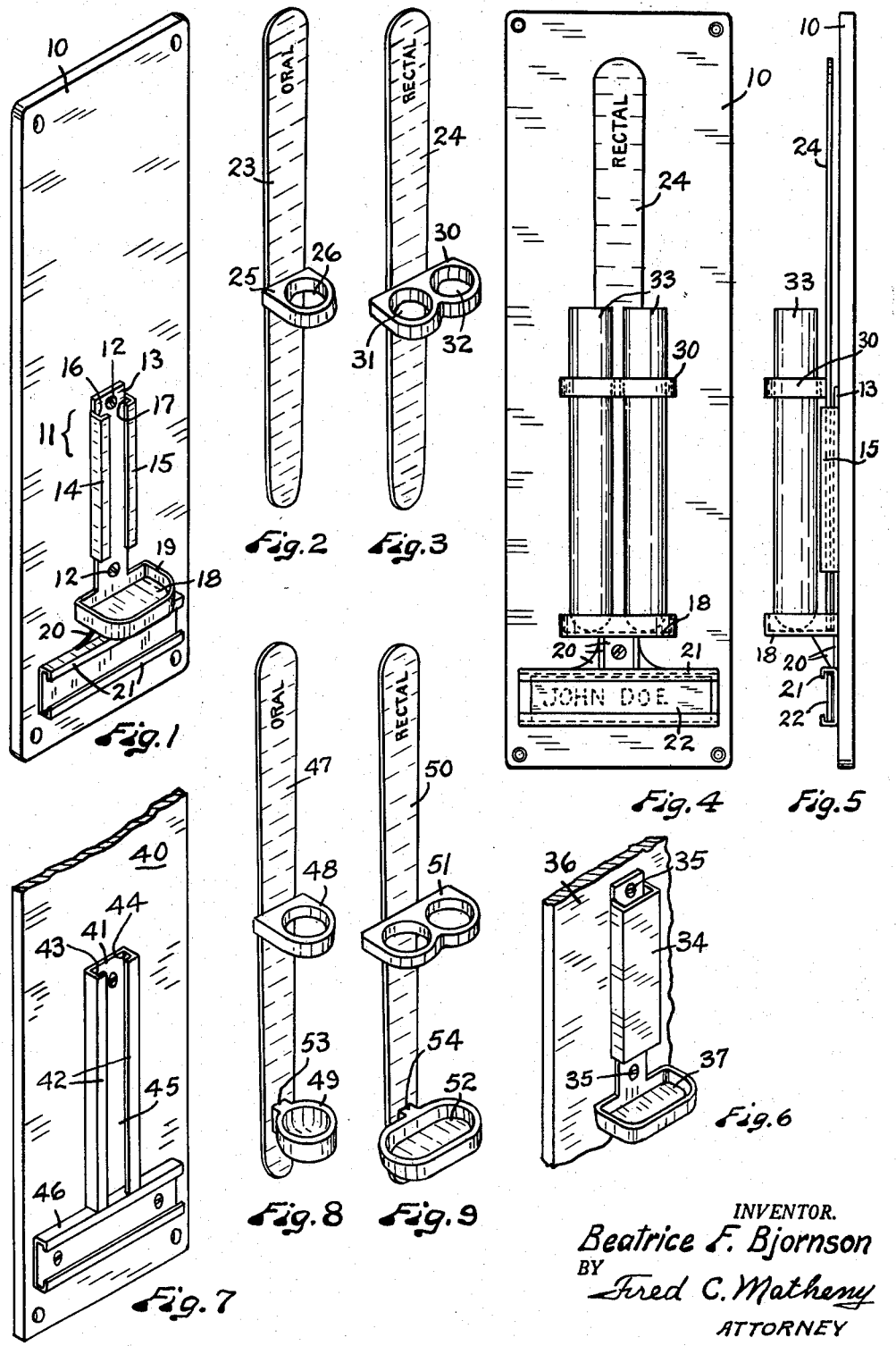
INVENTOR.
Beatrice F. Bjornson
BY
Fred C. Matheny
ATTORNEY +# United States Patent Office 2,943,745
Patented July 5, 1960

2,943,745

THERMOMETER HOLDER

Beatrice F. Bjornson, 420 Terry Ave., Apt. 310,
Seattle 4, Wash.

Filed Jan. 20, 1959, Ser. No. 787,882

6 Claims. (Cl. 211—60)

My invention relates to a thermometer holder for use in hospitals and like places where patients confined to beds are being cared for.

An object of my invention is to provide simple and convenient thermometer holding devices by which a thermometer for the individual use of a patient can be kept, under sanitary conditions, near the patient's bed where it is instantly available for use.

Another object is to provide thermometer holding devices which will minimize the danger of improper and unsanitary use of the thermometers held therein.

In hospitals and like places it is common practice to provide each patient with a thermometer and to keep each thermometer in a glass tube having disinfectant therein. It is also common practice to attach these glass tubes to the patient's bed or to a nearby wall with adhesive tape. This tape sticks to the bed or wall and to the tube, is sometimes difficult to remove, and may leave a deposit on the surfaces from which it is removed. For sanitary reasons it is necessary that each thermometer holding tube be removed and sterilized after use with each patient. Also the tube or tubes which receive the thermometer of each patient should be changed if the thermometer used by the patient is changed from a rectal to an oral type or vice versa. However, because of the time and trouble involved in changing these thermometer holding tubes if they are held by adhesive tape the tubes are not always replaced when they should be and it is possible that a thermometer used for an incoming patient may be placed in the tubes and solutions used for the thermometer of a former patient or that an oral thermometer may be placed in a tube and solution previously used for a rectal thermometer. Thus, if they are improperly used it is possible that the thermometer holders can be a means of spreading communicable disease. My invention minimizes the danger of improper use of thermometers by making it possible to quickly and easily remove and replace the tube or tubes used for the thermometer of each patient and by further providing holders of distinctively different appearance and markings for oral and rectal type thermometers.

When an oral thermometer is assigned to a patient only one tube containing disinfectant is required to receive and hold the same. When a rectal thermometer is to be used then two tubes are required, one containing disinfectant and the other containing oil. My invention contemplates the use of the same tube holding bracket to receive and support either a device for holding one tube for an oral thermometer or two tubes for a rectal thermometer. These two devices are readily distinguished from each other and this reduces the danger of improper use of the holders.

Other objects of my invention will be apparent from the following description and accompanying drawings.

In the drawings:

Figure 1 is a perspective view showing a mounting plate with attached bracket for receiving a device capable of holding a tube in which a thermometer may be placed.

Fig. 2 is a detached perspective view of an oral type tube holding device or ring-carrying plate capable of use with the mounting plate and bracket means shown in Fig. 1.

Fig. 3 is a detached perspective view of a rectal type tube holding device or ring-carrying plate capable of use with the mounting plate and bracket means shown in Fig. 1.

Fig. 4 is a view in front elevation of the mounting plate and bracket shown in Fig. 1 and with a rectal type ring-carrying plate held therein and two thermometer receiving tubes supported by these plates.

Fig. 5 is a side elevational view of the devices shown in Fig. 4.

Fig. 6 is a detached perspective view showing a fragment of a mounting plate and a bracket of modified form.

Fig. 7 is a perspective view showing a fragment of a mounting plate and another bracket of modified form.

Fig. 8 is a perspective view of an oral type ring-carrying plate used in connection with the bracket shown in Fig. 7 and having a shelf attached thereto to support a tube.

Fig. 9 is a perspective view of a rectal type ring-carrying plate used in connection with the bracket shown in Fig. 7 and having a duplex or double tube supporting shelf attached thereto.

Like reference numerals refer to like parts throughout the several views.

The apparatus shown in Figs. 1 to 5 comprises a mounting plate 10 capable of being secured to a wall or like support in an upright position. A guide bracket 11 is secured by screws 12 or other suitable means to the mounting plate 10. The bracket 11 comprises a back member 13 having two forwardly and inwardly extending lateral edge portions 14 and 15 which form spaced apart opposed guide channels 16 and 17. A tube supporting shelf 18 having a shallow marginal wall 19 is rigidly secured to or formed integral with the back plate 13 below the lower ends of the forwardly and inwardly extending edge portions 14 and 15. The shelf 18 is substantially wider than the portions of the bracket above it and it protrudes forwardly from and is substantially at right angles to the back member 13. Preferably parts 20 of the bracket 10 extend below the shelf 18 and support a name plate holder 21 within which a readily removable name plate 22 bearing the name of a patient can be displayed.

The guide channels 16 and 17 of each bracket 11 are adapted to slidably receive either a long thin flat oral type ring-carrying plate 23 or a similar long, thin flat rectal type ring-carrying plate 24. The oral type plate 23 carries a rigidly attached flat member 25 within which is a circular opening 26. The member 25, having therein the opening 26, extends outwardly from one face of the plate 23 and serves as a tube receiving ring. The plate 24 carries an integral or otherwise rigidly attached flat member 30 which is wider than the member 25 and has two circular openings 31 and 32 positioned alongside of each other thereby forming a duplex tube receiving ring. Preferably the ring-carrying plates 23 and 24 are rounded at both ends to make them more convenient to handle and use. Also preferably both of these plates 23 and 24 are convergently tapered slightly from the upper to the lower end. The plate 23 has the word "oral" inscribed on its front face near its upper end and the plate 24 is similarly marked with the word "rectal."

The plates 23 and 24 can be quickly and easily inserted in and removed from the guide channels 16 and 17 of the bracket 11 and are held upright by these channels when they are disposed therein. When a rectal type ring-carrying plate 24 is supported by a bracket 11 two ported by a bracket 11 only one tube can be held there—thermometer holding tubes 33 can be inserted through the openings 31 and 32 and will rest on the shelf 18, as shown in Figs. 4 and 5. When an oral type plate 23 is supported by a bracket 11 only one tube can be held thereby. The lower end of the plate 23 or 24 can rest on the shelf 18 when the plate is in the bracket 11. Also, obviously, by lengthening parts 14 and 15 or lowering members 25 and 30 on their plates 23 and 24 respectively, it is possible to have these members 25 and 30 rest on the upper ends of parts 14 and 15.

The difference in appearance between the two plates 23 and 24 taken in connection with the distinctive inscriptions on the two plates helps to minimize errors in the use of the two types of thermometers kept in the tubes held by these plates.

Fig. 6 shows a bracket of modified form made from a tube 34 of rectangular cross section secured by screws 35 to a mounting plate 36 and adapted to telescopically receive and hold the ring-carrying plates 23 and 24. The lower end portion of the bracket tube 34 has a shelf 37 provided thereon to support tubes, such as the tubes 33, shown in Fig. 4.

Figs. 7, 8 and 9 show a form of my invention in which each ring-carrying plate has a tube supporting shelf rigid with the lower end portion thereof and is capable of supporting a tube 33 independently of the devices by which the plate is held. In Fig. 7, 40 is a mounting plate and 41 is an upright bracket secured to the mounting plate 40. The bracket 41 has forwardly and inwardly bent edge portions 42 forming opposed, spaced apart, parallel guide channels 43 and 44 and leaving an upright slot 45 between the forwardly and inwardly bent edge portions 42.

A horizontal name plate holder 46 of cross sectional shape similar to bracket 41 extends across the bottom of bracket 41 and is secured to either the bracket 41 or mounting plate 40 or to both of these parts. The bracket 41 is adapted to telescopically and removably receive and hold either an oral type ring-carrying plate 47, which carries a single tube ring 48 and a tube supporting shelf 49, or a rectal type ring-carrying plate 50, which carries a duplex ring 51 and a tube supporting shelf 52. A shank 53 narrow enough to operate in the slot 45 supports the shelf 49 in spaced relation from the plate 47 and a similar shank 54 supports the shelf 51 in spaced relation from the plate 50. Downward movement of each plate 47 and 50 in the guide channels 43 and 44 is limited by engagement of the lower end of the plate 47 or 50 with the name plate holder 46, or this movement may be limited by engagement of ring member 48 or 51 with the upper ends of the flanges 42.

The plates 47 and 50, which have the respective shelves 49 and 52 rigidly secured to their lower end portions, provide a complete support for the tube or tubes 33 and these plates can be placed in and removed from the bracket 41 and otherwise handled with the tubes in them. When the plates 47 and 50 are lifted out of the bracket 41, while tubes 33 are supported thereby, the tubes will be lifted along with the plates and the danger of dropping the tubes will be minimized. However, the presence of the shelves 49 and 52 on the respective plates 47 and 50 make these plates 47 and 50 a little more bulky and cumbersome to handle, in sterilizing and cleaning the same than the plates 23 and 24 are.

My thrermometer holding device provides for displaying the name of each patient on his thermometer holder, provides a holder of distinctive appearance for each type of thermometer and displays the name of the type of thermometer to be placed in each holder. Also my device makes it easy to change the holders when such changes are needed and makes it easy for persons inspecting the thermometers to determine if they are being properly used and cared for.

The foregoing description and accompanying drawings clearly disclose preferred embodiments of my invention but it will be understood that changes may be made within the scope of the following claims.

I claim:
1. A holder for a thermometer receiving tube comprising a long thin flat ring-carrying plate; a tube receiving ring rigid with and perpendicular to said plate and positioned intermediate the length of the plate; a fixedly supported upright bracket having spaced apart opposed guide channels capable of telescopically and removably receiving said plate and supporting said plate in upright position; and a tube supporting shelf positioned adjacent the lower end of said bracket in spaced relation below and in alignment with said tube receiving ring when the plate is supported within the guide channels.

2. A holder for a thermometer receiving tube comprising a long thin flat ring-carrying plate; a tube holding member rigid with and perpendicular to the face of said plate intermediate the length of said plate, said member having two side by side openings therein forming tube receiving rings; a fixedly supported upright bracket having spaced apart opposed upright guide channels capable of telescopically and removably receiving said plate and supporting said plate in an upright position; and a tube supporting shelf positioned adjacent to the lower end of said bracket in spaced relation below and in alignment with said flange when said plate is supported in said guide channels.

3. A holder for a thermometer receiving tube comprising a long thin flat ring-carrying plate; at least one tube receiving ring rigid with and perpendicular to said plate and positioned intermediate the length of the plate; a fixedly supported upright bracket having spaced apart opposed guide channels telescopically and removably receiving said plate and supporting said plate in upright position; a tube supporting shelf positioned adjacent to the lower end of said bracket in spaced relation below and in alignmnet with said tube receiving ring when the plate is supported by the bracket; and a name plate bracket attached to said upright bracket and positioned below said tube supporting shelf.

4. A holder for a thermometer receiving tube comprising a mounting plate; a long thin flat ring-carrying plate; at least one tube receiving ring rigid with and perpendicular to said ring-carrying plate and positioned approximately mid way between the two ends thereof; a normally upright guide bracket secured to said mounting plate and having two spaced apart opposed guide channels adapted to slidably receive and support said ring carrying plate; and a tube receiving shelf rigid relative to said guide bracket and said mounting plate and positioned adjacent to the lower end of said guide bracket, whereby when said ring-carrying plate is supported in said guide bracket and a thermometer holding tube is positioned within said tube receiving ring the lower end of said tube will rest on said shelf.

5. A holder for a thermometer receiving tube comprising a normally upright rigid guide bracket having two spaced apart opposed substantially parallel guide channels; a plurality of long thin flat ring-carrying plates adapted for interchangeable telescopic insertion in said guide channels, at least one of said ring-carrying plates being an oral type plate and carrying one outwardly extending rigidly attached tube receiving ring intermediate its two ends and at least another of said ring-carrying plates being a rectal type plate and carrying two side by side outwardly extending rigidly attached tube receiving rings intermediate its two ends; and an outwardly protruding rigidly mounted tube supporting shelf positioned adjacent the lower end of said bracket, whereby when a plate carrying one tube receiving ring is supported in said bracket one tube can be placed within said ring and rest on said shelf and when a plate carrying two tube receiving rings is supported in said bracket two tubes can be inserted in said rings and rest on said shelf.

6. A holder for a thermometer receiving tube comprising a mounting plate; a long thin flat ring-carrying plate; at least one tube receiving ring rigid with and extending outwardly from said ring-carrying plate and positioned intermediate the two ends of the plate; a tube supporting shelf carried by and rigid with the lower end portion of said ring-carrying plate in spaced relation from said tube receiving ring; and a normally upright guide bracket secured to said mounting plate and having two spaced apart opposed guide channels capable of slidably receiving and supporting said ring-carrying plate.

References Cited in the file of this patent

UNITED STATES PATENTS

| | | |
|---|---|---|
| 1,449,195 | Ross | Mar. 20, 1923 |
| 1,624,830 | Emsley | Apr. 12, 1927 |
| 2,191,782 | Valane | Feb. 27, 1940 |